(No Model.)  J. SHOUREK.  4 Sheets—Sheet 1.
BRAKE MECHANISM.

No. 571,697. Patented Nov. 17, 1896.

Witnesses
Wm H. Edwards

Inventor
John Shourek
By J. H. Bliss
Attorney (No Model.) 4 Sheets—Sheet 2.
J. SHOUREK.
BRAKE MECHANISM.
No. 571,697. Patented Nov. 17, 1896.
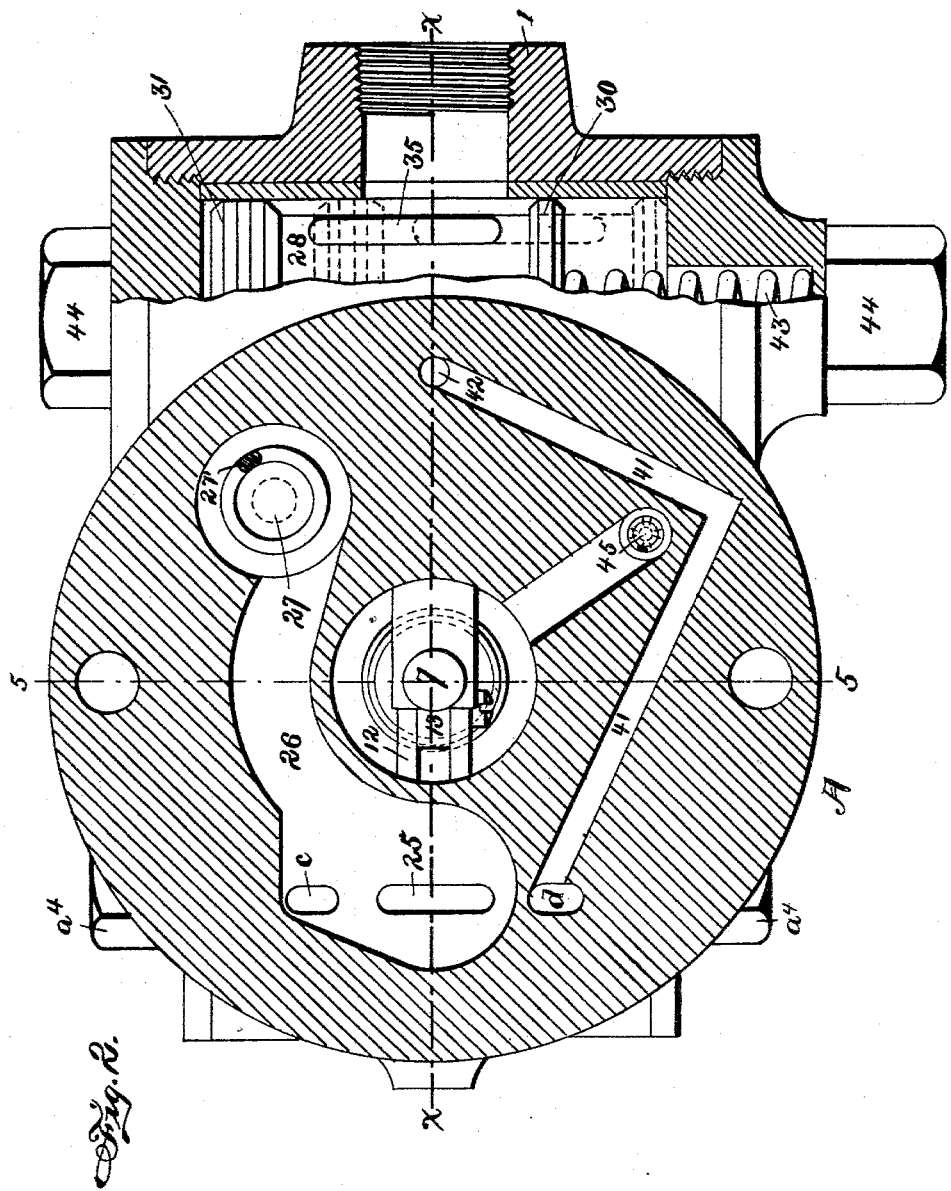
Witnesses:
W. H. Edwards
Inventor
John Shourek
By H. H. Bliss.
his Atty.

(No Model.) 4 Sheets—Sheet 3.
J. SHOUREK.
BRAKE MECHANISM.
No. 571,697. Patented Nov. 17, 1896.
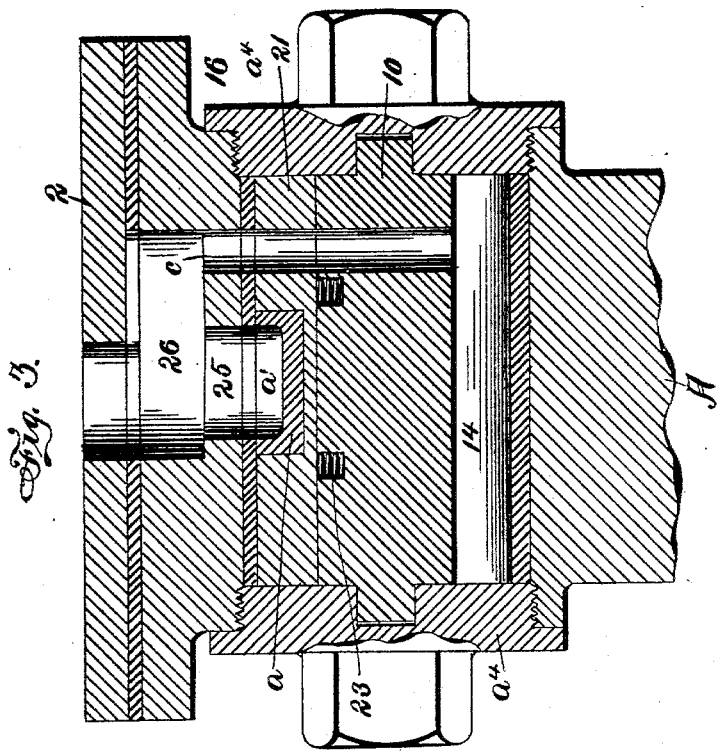
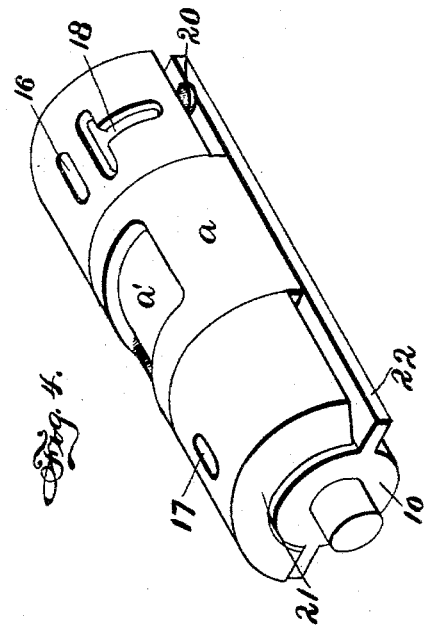
Witnesses:
W. H. Edwards
Inventor
John Shourek
By H. W. Bliss
his Atty.

(No Model.)  4 Sheets—Sheet 4.

J. SHOUREK.
BRAKE MECHANISM.

No. 571,697.  Patented Nov. 17, 1896.

Witnesses:—
W. H. Edwards

Inventor
John Shourek
By T. H. Bliss
his Atty

UNITED STATES PATENT OFFICE.

JOHN SHOUREK, OF ALLEGHENY, PENNSYLVANIA.

BRAKE MECHANISM.

SPECIFICATION forming part of Letters Patent No. 571,697, dated November 17, 1896.

Application filed May 14, 1895. Serial No. 549,330. (No model.)

*To all whom it may concern:*

Be it known that I, JOHN SHOUREK, a citizen of the United States, residing at Allegheny city, in the county of Allegheny and State of Pennsylvania, have invented certain new and useful Improvements in Brake Mechanism; and I do hereby declare the following to be a full, clear, and exact description of the invention, such as will enable others skilled in the art to which it pertains to make and use the same, reference being had to the accompanying drawings, which form a part of this specification, in which—

Figure 1:
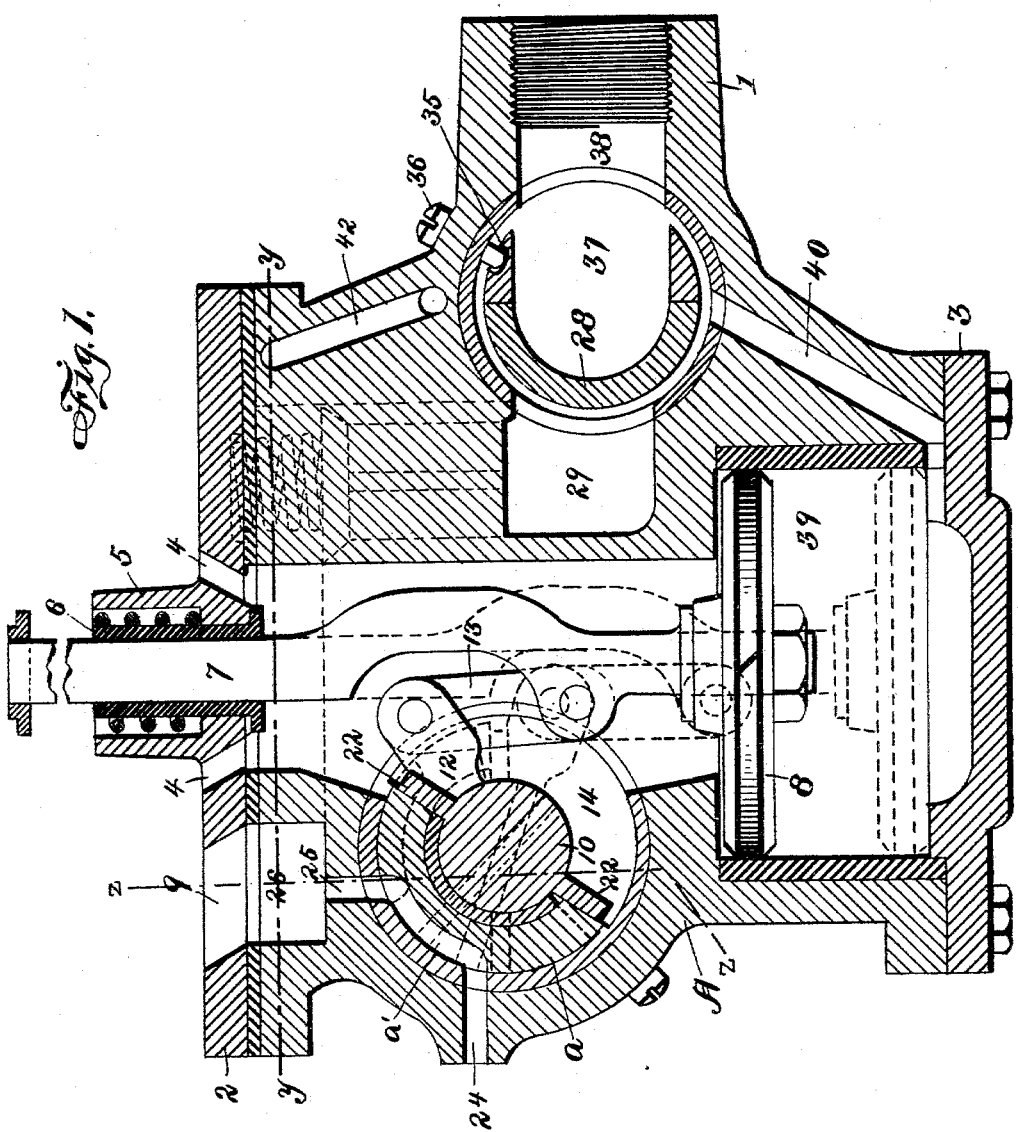
Figure 5:
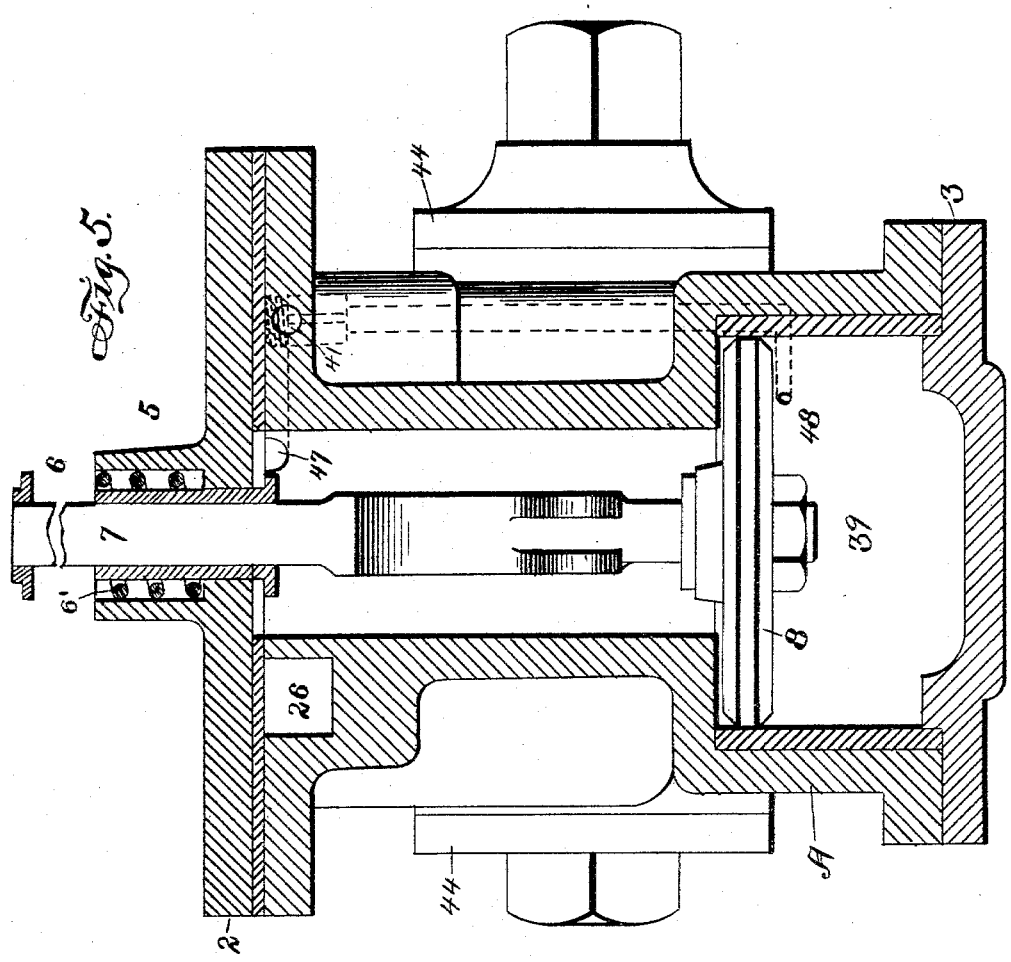
Figure 6:
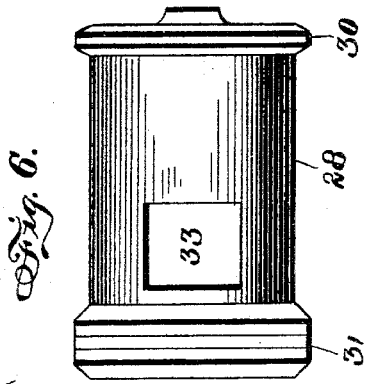

Figure 1 is a sectional view on the line $xx$ of Fig. 2, showing the position of parts when the brakes are off. Fig. 2 is a sectional view on the line $yy$ of Fig. 1. Fig. 3 is a sectional view on the line $zz$ of Fig. 1, showing the rotary valve in the position occupied when making an "emergency" stop. Fig. 4 is a detail view of the rotary valve. Fig. 5 is a sectional view on the line 5 5 of Fig. 2. Fig. 6 is a detail view of the "quick-action" valve.

My invention relates to mechanism for applying air to railway-brakes for the purpose of gradually, more quickly, and very quickly, and with maximum pressure, applying the brakes and arresting the momentum of a railway-train; and to this purpose it consists in the peculiar construction and arrangement of parts that will be hereinafter pointed out and described.

In the accompanying drawings, in which like letters and numerals of reference designate corresponding parts in all of the figures, A designates the main case or shell of my improved brake mechanism. This case A is provided with an internally-threaded nipple or inlet 1 to receive one end of the usual train-pipe. (Not shown.)

The open ends of the case A are closed by means of caps 2 3, bolted or otherwise suitably secured to the body thereof. There is thus formed within the case A a piston chamber or compartment 39, in which is arranged a piston 8, the rod or stem 7 of which extends through a suitable bearing or thimble 6, fitted in a passage formed in a centrally-arranged projection 5 on the cap-plate 2. The end of the case A, covered by this cap 2, is arranged adjacent to the auxiliary reservoir, in which air is maintained under pressure; but as this reservoir is commonly used in this class of apparatus and its construction forms no part of my present improvements I have not thought it necessary to illustrate the same. The interior of the case A communicates with the auxiliary reservoir through a series of ports 4, formed in the cap 2 around the projection 5 thereon. Said cap-plate also has formed therein a port or passage 9, through which air can pass from the case A to the brake-cylinder. (Not shown.)

The passage of air through this port 9 is controlled by the main rotary valve, which is arranged in a valve-chamber 14, that communicates with the piston-chamber 39 aforesaid, the valve itself being connected to and adapted to be actuated by the piston rod or stem 7. As shown, this valve consists of a body 10, cylindrical in cross-section and provided at its ends with trunnions which are mounted in suitable socket-bearings formed in the inner walls of removable caps $a^4$, by which the ends of the valve-chamber 14 are closed.

The body 10 of the valve is provided at diametrically opposite points with projecting flanges 22, which support and actuate the other portion 21 of the valve. This member 21 of the valve is held close against the adjacent surface of the valve-chamber 14 by means of coiled springs 23, fitted in sockets in the valve-body 10 and contacting with the inner surface of the said member 21. In the outer surface or wall of this member 21 there is formed a guideway or groove in which is fitted a sliding plate $a$, having formed in its outer surface a way or groove $a'$. As shown, this sliding plate $a$ covers a port or aperture in the body of the member 21 of the valve. In the outer member 21 of the valve there are formed three other ports. Two of these, 16 17, extend directly through the body of such member and are adapted to aline with passages extending through the body 10 of the valve. The other port opens at its inner end through one of the straight edges of the member 21, and its other end communicates with a T-shaped groove or way 18, formed in the outer surface of the member 21. When the brakes are off and the parts are in the positions shown in full lines in Fig. 1, this latter port 19 is closed by a conical-shaped pin or projection 20, carried by one of the flanges 22 on the valve-body 10.

The port 16 and way 18 in the valve are arranged in the same transverse plane and are adapted to successively aline with a port c, formed in the wall of the valve-chamber 14, as the valve is moved by means to be hereinafter described, and the way or groove $a'$ in the sliding plate $a$ is adapted at different times to connect a port 25, formed in the wall of the valve-chamber 14, with the piston-chamber 39 and with an exhaust-port 24, also formed in the wall of the valve-chamber 14. The port 17 is arranged in a longitudinal plane at one side of that of the port 16 and is adapted to communicate with one end of a short passage or duct $d$ when the valve has been rotated sufficiently far to cause the way or groove $a'$ to connect the piston-chamber with the port 25 for a purpose to be described.

The valve mechanism last described is connected with and actuated from the piston 8 as follows: 12 designates a link or connecting-rod, one end of which is threaded and screwed into a suitable socket or passage in the valve-body 10. The other end of the rod 12 is bifurcated, and in such bifurcated end is pivoted one end of another link 13, the opposite end of which is pivotally connected to the stem or rod 7 of the piston. It will thus be seen that there is a toggle-like connection between the piston-rod and the rotary valve, and by reference to Fig. 1 it will be seen that the piston-rod is bowed or curved away from the valve somewhat to allow free movement of the connection 12 13.

The stem 7 of the piston extends through a thimble or sleeve 6, which passes through the cap-plate 2. The said cap-plate is provided with a socketed projection 5, and within the socket therein and about the thimble or sleeve 6 is fitted a coiled spring 6'. This spring is adapted to normally hold the piston-rod and piston in the positions indicated in full lines in Fig. 1, a cap 7' being secured on the upper end of the piston and having its under face or surface in contact with the upper end of said spring.

Between the piston chamber or compartment and the train-pipe inlet I interpose a quick-action valve 28. This valve, which is preferably of the cross-sectional form shown in Fig. 1, is arranged in a suitable chamber 37, that communicates with the aforesaid inlet 1 through a short passage 38. The valve is somewhat shorter than the length of the chamber 37 and is normally held in the position shown in full lines in Fig. 2 by means of a coiled spring 43, which is arranged within a socket formed in one of the detachable heads or caps 44, by which the ends of the chamber 37 are closed. The valve is prevented from turning by means of a pin 36, extending through the wall of the chamber 37 and projecting into a longitudinally-extending groove 35 formed in the valve. As shown, the valve consists of two heads 30 31 and a connecting member having a concave face on the side adjacent to the passage 38. In the connecting member, which, as shown in Fig. 1, is substantially crescent shape in cross-section, and at a point relatively near the head 31 there is formed a port 33, adapted, when the valve is forced into such position as to compress the spring 43, to connect the passage 38 and inlet 1 from the train-pipe with a duct 29, formed in the case A between the piston-chamber and the valve-chamber 37. The other end of the duct 29, which is normally closed by a puppet-valve 27, opens into a channel or passage 26, formed in the casing A adjacent to the cap 2. This passage 26 serves also to connect the ports $c$ and 25 in the wall of the valve-chamber 14 with the port 9 in the plate 2. The puppet-valve 27 is normally maintained in its closed position by a coiled spring 27'.

The piston-chamber 39 is connected with the valve-chamber 37 through a duct or passage 40, and the two valve-chambers 14 and 37 are connected by a duct or passage 41, leading from the duct $d$, before described, to and communicating with one end of a duct or passage 42, the other end of which opens into the chamber 37 near the end thereof opposite from the coiled spring 43.

45 designates a spring-pressed puppet-valve adapted to close a passage or duct provided at its ends with branches 47 48, that communicate at their inner ends with the piston compartment or chamber. Gaskets are arranged between the caps and the body of the case A and between the cap 2 and the auxiliary reservoir for the purpose of maintaining air-tight joints between the parts.

The manner of operating my improvements may be briefly stated as follows: When the brakes are off and the parts of the apparatus occupy the positions shown in full lines in Figs. 1 and 2, the pressure from the train-pipe on one side of the piston and from the auxiliary reservoir on the other side thereof are equal, and the tension of the spring arranged between the thimble 6 and inner wall of the passage in the projection 5 holds the piston and rotary valve in such position that the ports of the latter are all closed, and the groove or way $a'$ in the sliding plate $a$ of the valve connects the port 25 with the exhaust-port 24, so that the air in the brake-cylinder is exhausted into the atmosphere. The spring 43 holds the valve 28 in such position as to maintain the port 34 thereof out of line with the air-inlet 1, and the spring 27' is sufficient to hold the puppet-valve closed and prevent the passage of air from the train-pipe to the brake-cylinder. When it is desired to apply the brakes slowly and gradually, the engineer reduces slightly, by opening a suitable valve, the pressure in the train-pipe. Instantly the pressure on the piston from the auxiliary reservoir, which is now greater than that on the other side, causes the piston to move toward the position shown in dotted lines in Fig. 1. This causes the valve-body 10 to rotate slightly, the first action being to cause the sliding plate $a$, which, as shown, rests on the flange 22 farther from the piston, to move sufficiently to bring the solid part thereof across the exhaust-port and break the connection between such port and the port 25. Simultaneous with this movement of the sliding piece $a$ the conical-shaped pin 20, carried by the other flange 22 of the valve, is withdrawn from its port, and such port being in line with the opening between the valve-chamber 14 and the piston-chamber air from the auxiliary reservoir and piston-chamber can pass through the same into the way 18, which alines with the port $c$, and from there through the port 9 into the brake-cylinder. The air will continue to pass from the auxiliary reservoir to the brake-cylinder in the manner just described until the pressure exerted by the air in the piston-chamber and the reservoir on the piston is less than that exerted by the train-pipe, when the piston will be returned to its normal position. If, however, the pressure in the train-pipe is reduced to a somewhat greater extent than is necessary to open the port normally closed by the pin 20, the piston will be moved correspondingly farther from its normal position and the valve in the chamber 14 rotated a correspondingly greater distance. As the valve-body 10 rotates the flange 22 thereof, which, as above described, serves to move the sliding member $a$ toward the piston, comes in contact with the adjacent straight side or surface of the member 21 of the valve and as it continues to move brings the port 16 into alinement with the port $c$ aforesaid and allows a greater amount of air to pass from the auxiliary reservoir to the brake-cylinder, and the brakes will be applied more suddenly than when the air passes through the port controlled by the pin 20.

If the pressure in the train-pipe is suddenly and materially reduced, the piston will be instantly forced into the position indicated in dotted lines. This movement of the piston imparts a correspondingly-increased movement of the valve in the chamber 14. That is, said valve is rotated to such an extent that the port 17 therein alines with the duct $d$ and the way or groove $a'$ in the sliding member $a$ of the valve connects the port 25 with the piston-chamber and the auxiliary reservoir, thus allowing or providing a relatively large passage from the auxiliary reservoir to the brake-cylinder. As soon as the port 17 alines with the duct $d$ and establishes communication between the piston-chamber and the passages 41 42 the quick-action valve 28 is moved into the position indicated in dotted lines in Fig. 2, compressing the spring 43 in its socket and bringing the large port 34 into line with the inlet 1 and the passage 29. The pressure of the air in the train-pipe when the parts are in this position is sufficient to raise the valve 27 and establish communication between the train-pipe and the brake-cylinder through the passages 29 and 26 and the port 9.

It will thus be seen that I utilize the pressure of the air in the auxiliary reservoir to positively open the valve controlling the passage direct from the train-pipe to the brake-cylinder, and when the parts are in the positions last described the entire pressure of both the reservoir and the train-pipe will be exerted on the piston in the brake-cylinder, thereby causing an instant setting of the brakes.

When the brakes have been set and the pressure in the brake-cylinder and passage 26 equals that in the train-pipe, the valve 27 is closed and the spring 43 returns the valve 28 to the position shown in full lines in Fig. 2. Air from the train-pipe then passes through the passage 40, the controlling-valve in the train-pipe having been previously closed, into the piston-chamber 39 and forces the same toward the full-line position in Fig. 1. The instant such movement begins the flange 22, adjacent to the piston of the valve in the chamber 14, moves the sliding piece $a$ sufficiently to prevent the passage of air from the auxiliary reservoir and piston-chamber through the groove or way $a'$, and as the movement continues said groove or way again connects the ports 24 25. After the piston has moved a sufficient distance to carry the groove $a'$ entirely into the valve-chamber 14 it passes and exposes the inner end of the passage 48. Air can then pass from the piston-chamber 39 on the side of the piston adjacent the passage 40 through the passages 48 47, lifting the valve 45, into the piston-chamber and the auxiliary reservoir on the opposite side of the piston-head. By the time the piston has reached the full-line position of Fig. 1 the pressure on opposite sides of the piston-head is equal and the ports in the main rotary valve are all closed.

What I claim is—

1. In an air-brake mechanism, the combination with a train-pipe, a brake-cylinder, and an auxiliary reservoir, of a piston-chamber communicating with the train-pipe and with the auxiliary reservoir, a piston arranged in said chamber, a valve-chamber having a port 25 communicating with the brake-cylinder and an exhaust-port, a rotary valve arranged in said chamber and having a sliding member provided with a groove or way adapted to connect the port 25 with the piston-chamber and the auxiliary reservoir or with the exhaust-port, and connections between the piston and the valve, substantially as set forth.

2. In an air-brake mechanism, the combination with a train-pipe, an auxiliary reservoir, and a brake-cylinder, of a rotary controlling-valve consisting of a body portion having laterally-projecting flanges on opposite sides thereof, and another member, fitted between said body and the wall of the valve-chamber and adapted to be moved by the flanges on the body, substantially as set forth.

3. A valve for an air-brake mechanism consisting of a rotary body having laterally-projecting flanges on opposite sides thereof, and another member partially surrounding the rotary body and adapted to be moved by the flanges thereon, said rotary body being adapted to have a limited movement independent of the other member, and the latter having formed therein a port adapted to be closed by one of the flanges on the rotary body, substantially as set forth.

4. A valve for an air-brake mechanism consisting of a rotary body, 10, having laterally-projecting flanges on opposite sides thereof, another member, 21, partially surrounding the rotary body and adapted to be moved by the flanges thereon, and a sliding plate fitted in a way in the member 21 and having its ends in contact with both of the flanges on the body 10 and a passage or groove formed in its outer face, substantially as set forth.

5. In an air-brake mechanism, the combination with a train-pipe, an auxiliary reservoir, a brake-cylinder, a piston-chamber communicating with the train-pipe and with the auxiliary reservoir, and a piston arranged in the piston-chamber, of a valve arranged between the piston-chamber and the brake-cylinder and consisting of a rotary body connected with the piston and having laterally-projecting flanges on opposite sides thereof, another member, 21, partially surrounding the rotary body between and adapted to be moved by the flanges thereon, the member 21 having a port or ports in line with ports in the rotary body and another port adapted to be closed by a plug or pin on one of the flanges of the rotary body, and a sliding plate fitted in a way formed in the member 21 and extending continuously from one of the flanges on the rotary body to the other and having in its outer surface an air-passage, substantially as set forth.

In testimony that I claim the foregoing I hereunto affix my signature this 19th day of January, A. D. 1895.

JOHN SHOUREK. [L. S.]

In presence of—
JAS. J. MCAFEE,
C. A. WILLIAMS.